Figure 1:
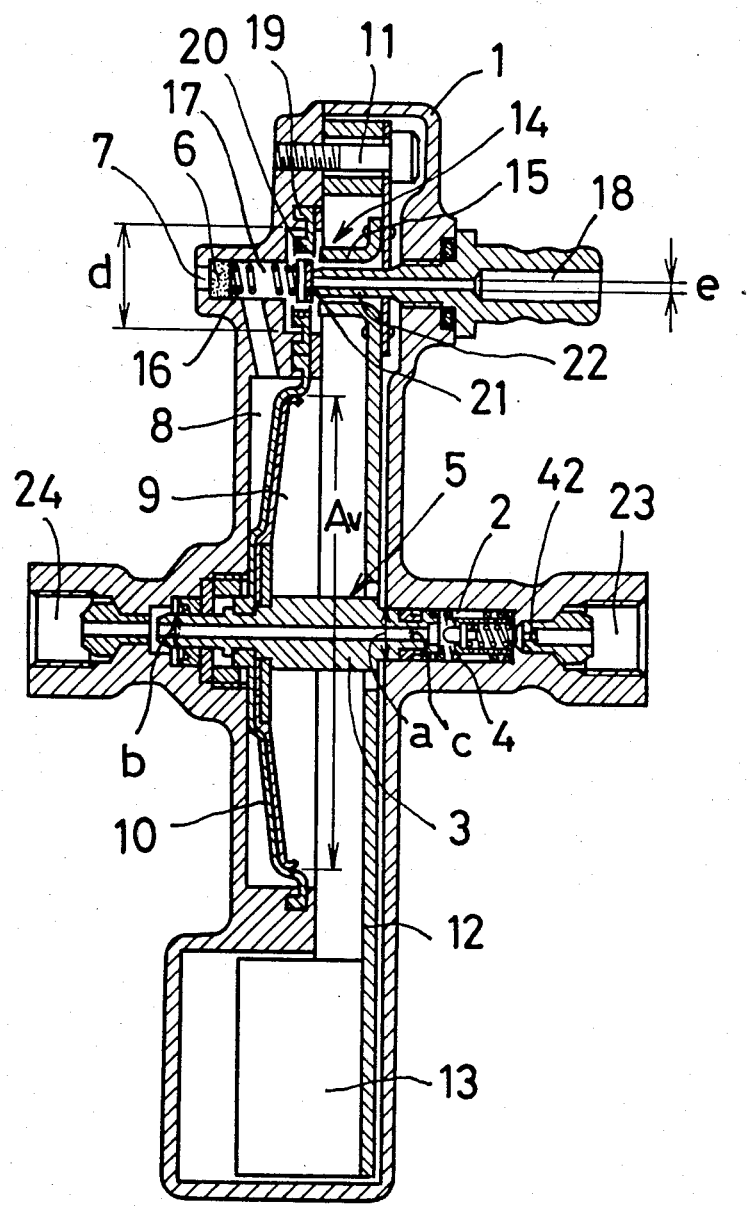

United States Patent [19]

Kohno

[11] Patent Number: 4,637,661
[45] Date of Patent: Jan. 20, 1987

[54] DECELERATION-BALANCED TYPE BRAKE PRESSURE CONTROL VALVE ASSEMBLY

[75] Inventor: Teruhisa Kohno, Itami, Japan

[73] Assignee: Sumitomo Electric Industries, Ltd., Osaka, Japan

[21] Appl. No.: 764,881

[22] Filed: Aug. 12, 1985

[30] Foreign Application Priority Data

Aug. 24, 1984 [JP] Japan .................. 59-177309

[51] Int. Cl.$^4$ ............................................. B60T 8/00
[52] U.S. Cl. .................. 303/24 A; 303/24 C; 303/24 F
[58] Field of Search ............... 303/24 A, 24 R, 24 C, 303/24 F, 24 B, 24 BB, 6 C, 6 R; 188/195, 349, 356

[56] References Cited

U.S. PATENT DOCUMENTS

| | | | |
|---|---|---|---|
| 3,377,108 | 4/1968 | Eddy | 303/24 C |
| 3,430,439 | 3/1969 | Brandon, Jr. | 303/6 C X |
| 3,495,882 | 2/1970 | Stelzer | 303/6 C X |
| 3,588,188 | 6/1971 | Shattock | 303/24 C X |
| 4,131,326 | 12/1978 | Takayama et al. | 303/24 R X |
| 4,133,584 | 1/1979 | Ohta et al. | 303/24 C |
| 4,212,500 | 7/1980 | Ando et al. | 303/24 A X |
| 4,225,192 | 9/1980 | Dufft | 303/24 A |
| 4,253,707 | 3/1981 | Takata | 303/24 A X |
| 4,314,731 | 2/1982 | Farr | 303/24 A |
| 4,360,238 | 11/1982 | Farr | 303/24 A |
| 4,422,693 | 12/1983 | Farr | 303/24 A |
| 4,432,586 | 2/1984 | Andoh et al. | 303/24 R X |

Primary Examiner—Douglas C. Butler
Attorney, Agent, or Firm—Ernest A. Beutler

[57] ABSTRACT

A brake pressure control valve assembly is proposed which balances the input brake pressure with the output pressure and with a pressure difference between the atmospheric pressure and a controlled vacuum pressure proportional to the deceleration. Only a small part is always under the vacuum pressure and the regulating chamber, in which there is an inertia body, is under the atmospheric pressure while not braking and under the controlled vacuum pressure while braking. Most of the chambers are not under the vacuum pressure but under the atmospheric pressure.

3 Claims, 2 Drawing Figures

DECELERATION-BALANCED TYPE BRAKE PRESSURE CONTROL VALVE ASSEMBLY

The present invention relates to a deceleration-balanced type brake pressure control valve assembly which controls the output brake pressure by maintaining balance among the deceleration that occured during braking and the brake input pressure and the brake output pressure throughout during braking for optimizing the distribution of braking force.

Deceleration-sensitive brake pressure control valve assemblies are known which seal by means of an inertia valve the brake fluid upon the occurrence of a predetermined deceleration and uses the sealed pressure to control what is called the split point at which the reduction of the input pressure is started. Over the linkage type pressure control valve assemblies which detect the amount of displacement in height of the pallet resulting from change in the live load with respect to the axis of the rear wheels to control the split point accordingly, the deceleration-sensitive pressure control valve assemblies have several advantages: less limitation to the place for installation, no necessity of fine adjustment during the vehicle assembly, and less change with time of the input/output pressure characteristics due to change with time of the suspension unit. However, they have the following disadvantages:

(1) The sealed pressure obtained at an early stage of control determines the output pressure during the entire period of braking. Therefore, if an abnormal pressure is sealed at sudden braking, the output pressure will be kept out of order throughout braking.

(2) Change in the sealed pressure with change in the live load has to be amplified to obtain a considerably large change in the split point. With this, the change in the sealed pressure due to various causes such as the application rate of the brake fluid pressure, fluid drag, manufacturing error of the control valve, etc, is also amplified. This increases the error in controlling the split point.

In order to solve these problems, the applicant proposed in Japanese Patent Laid-open Publication No. 47-31070 a pressure control valve assembly for obtaining a desired output brake pressure during the entire period of braking by maintaining a balance among the input brake pressure, the output brake pressure and the inertia force obtained by the deceleration acting on an inertia body. However, such a control valve assembly requires a considerably large inertia body to balance the fluid pressure with the inertia force if the brake fluid pressure is applied from a master cylinder.

Also, British Pat. Nos. 2010996A, 2051275A and 2082705A proposed control valve assemblies which are provided with a control fluid pressure regulator including an inertia body for detecting the deceleration to produce a control pressure proportional to the deceleration by balancing the inertia force acting on the inertia body with the pressure of a control fluid other than the brake fluid, instead of balancing the inertia force directly with the input and output brake pressures, and control the output pressure by comparing the control pressure with the input and output pressures throughout the braking.

However, such prior art control valve assemblies have the following shortcomings. In these prior art assemblies, an inertia body is disposed in a vacuum chamber communicating with a source of vacuum pressure and a control pressure chamber for producing a controlled vacuum pressure communicates with the vacuum chamber while no deceleration occurs. The pressure difference between these two chambers, which develops upon the occurrence of deceleration, is balanced against the input and output brake pressures to control the output pressure. Thus, while brake is not applied and thus the vacuum pressure regulator is not operating, both the vacuum chamber and the control pressure chamber communicate with a source of vacuum pressure. This means that throughout during the non-braking period, the outer walls of these two chambers are kept under the pressure difference between the atmospheric pressure and the vacuum pressure. This requires much care in maintaining reliability from viewpoints of airtightness and strength.

An object of the present invention is to provide a brake pressure control valve assembly which obviates the abovementioned shortcomings.

In accordance with the present invention, in order to increase the reliability in safety, an inertia body is disposed in a regulating chamber which is connected to the air while not braking and is under a vacuum pressure proportional to a deceleration after the deceleration has occurred.

With this arrangement, only small part is always under vacuum pressure whereas most of the chambers including the regulating chamber are under the atmospheric pressure while not braking. During the braking, only the regulating chamber is under a controlled vacuum pressure while other chambers are under the atmospheric pressure.

Figure 2:
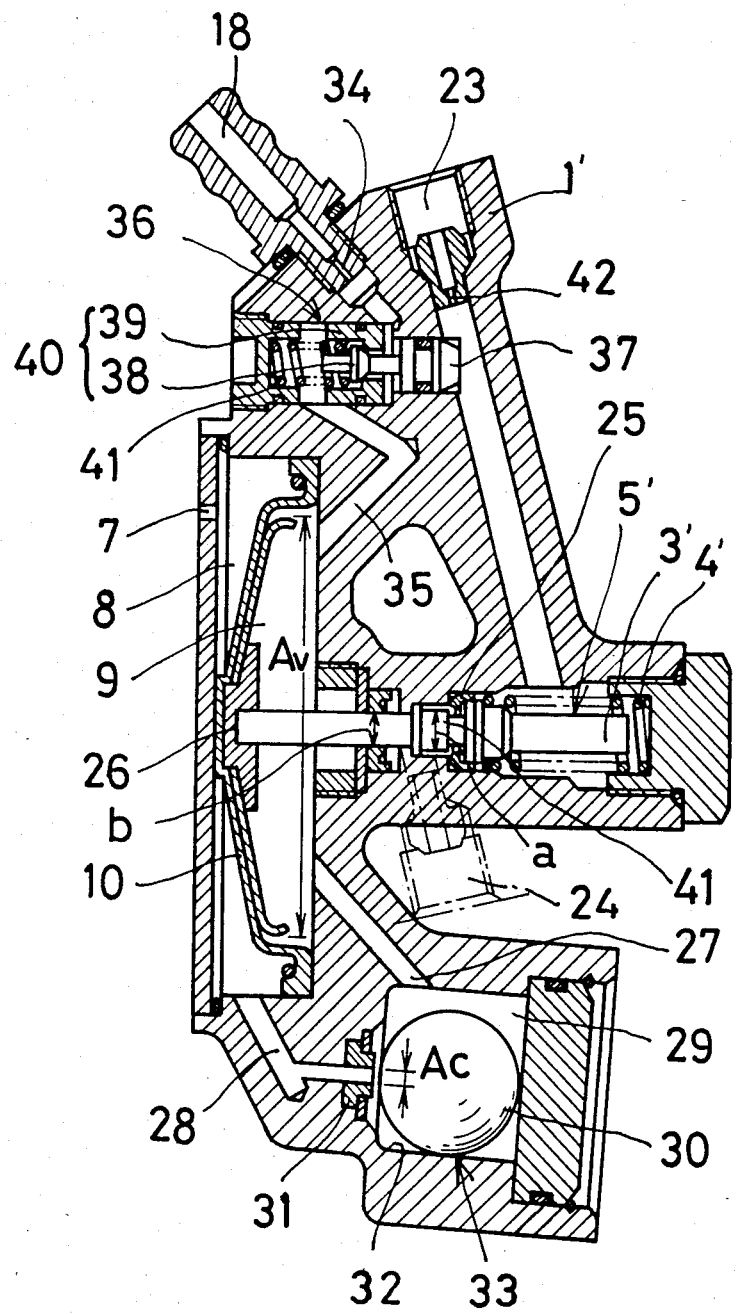

Other objects and features of the present invention will become apparent from the following description taken with reference to the accompanying drawings, in which:

FIG. 1 is a vertical sectional view of the first embodiment of the present invention; and FIG. 2 is a similar view of the second embodiment.

The pressure control valve assembly shown in FIG. 1 is of a type in which an inertia force acting on an inertia body is amplified at a certain lever ratio and a pressure difference between the atmospheric pressure and the vacuum pressure, acting on the valve body in a vacuum pressure regulator is balanced against the amplified force to regulate the pressure difference to a value proportional to the deceleration.

The control valve assembly comprises a body 1, a poppet valve 2, a pressure reducing valve 5 having a fluid-responsive plunger 3 formed with a through hole and adapted to cooperate with the poppet valve 2 to control the passage therethrough, and a spring 4 for urging the plunger 3 in its opening direction.

To the plunger 3 is secured a power piston 10 which partitions airtightly an air chamber 8 from a regulating chamber 9. The air chamber 8 is directly connected to an air inlet 7 provided with a porous plug 6. In the regulating chamber 9, an inertia body 13 is suspended by a lever which is pivotable around a fulcrum 11. The lever 12 serves to amplify the inertia force acting on the inertia body 13.

At a point of action for the lever 12, a regulating valve 14 is provided. It comprises an annular valve body 15 integral with the lever 12, and a diaphragm 19 urged by a spring 16 at one side disposed in an air chamber 17 connected to the air inlet 7. The other side of the diaphragm 19 is disposed in a vacuum chamber 18 partitioned from the regulating chamber 9 by a fixed valve seat 22 concentric with the annular valve body 15.

The diaphragm 19 has a hole 20 at a position corresponding to the annular valve body 15, the hole 20 communicating the air chamber 17 with the regulating chamber 9. While no inertia force is acting on the inertia body 13, the valve body 15 remains off the diaphragm 19, keeping the hole 20 open. On the other hand, a seal valve 21 in the center of the diaphragm is urged by the spring 16 against a fixed valve seat 22 provided at one end of the vacuum chamber 18 to close the passage between the vacuum chamber 18 and the regulating chamber 9. The numeral 23 is an inlet port and 24 is an outlet port.

Thus, while brake is not applied, only the vacuum chamber 18 is under the vacuum pressure whereas the air chambers 8 and 17 and the regulating chamber 9 are under the atmospheric pressure. So, no thrust is produced by the power piston 10.

When brake is applied and an inertia force acts on the inertia body 13, the valve body 15 moves leftwardly in FIG. 1, closing the hole 20 in the diaphragm and simultaneously compressing the spring 16 to press the seal valve 21 leftwardly to move it away from the fixed valve seat 22. Now the vacuum chamber 18 communicates with the regulating chamber 9. Thus, vacuum pressure evacuates the air in the regulating chamber 9. This produces a pressure difference across the diaphragm 19. The pressure difference acts on the inertia body 13, and is balanced against the inertia force amplified by the lever 12, so that it is regulated to a value proportional to the deceleration. Now a thrust proportional to the deceleration is applied to the power piston 10 and to the plunger 3. After braking has been started, as the deceleration increases, the thrust on the power piston 10 increases to move the plunger 3 rightwardly to close the pressure reducing valve 5, which starts the reduction of pressure.

In this state, the forces acting on the plunger 3 from both sides can be expressed as follows:

$$Pf \cdot A + F = Pr \cdot B + Pv \cdot Av \tag{1}$$

wherein
Pf: Input Pressure
Pr: Output pressure
A: Cross-sectional area (=a−c) of the plunger 3 which receives the input pressure
B: Cross-sectional area (=b−c) of the plunger which receives the output pressure
F: Force of spring 4
Pv: Pressure difference between air chamber 8 and regulating chamber 9
Av: Effective sectional area of the power piston 10 which receives the pressure difference Also, balance of the forces acting on the diaphragm 19 can be expressed as follows:

$$\omega\alpha = Pv(d-e) + Pv_{max} \cdot e + f \tag{2}$$

wherein $\omega$: Weight of the inertia body multiplied by lever ratio
$\alpha$: Deceleration
d: Effective area of diaphragm
e: Effective area at the seal valve on the diaphragm
$Pv_{max}$: Vacuum pressure in the vacuum chamber
f: Force of spring 16

Also, the following equation holds good from the relationship between the brake fluid pressure and the deceleration:

$$W \cdot \alpha = Pf \cdot Cf + Pr \cdot Cr - Fo \tag{3}$$

wherein
W: Weight of vehicle
Cf: Brake constant of front wheel brakes
Cr: Brake constant of rear wheel brakes
$F_o$: Sum of the pressure losses of the front and rear wheels at rise-up multiplied by their brake constants Eliminating Pv and $\alpha$ from the equations (1), (2) and (3), $$Pr = \frac{\left(A - \frac{Av}{d-e} \frac{\omega}{W} \cdot Cf\right) Pf + F + \frac{Av}{d-e} \left(\frac{\omega}{W} Fo + Pv_{max} \cdot e + f\right)}{B + \frac{Av}{d-e} \frac{\omega}{W} \cdot Cr} \tag{4}$$

The reduction ratio R can be expressed as follows:

$$R = \frac{A - \frac{Av}{d-e} \frac{\omega}{W} \cdot Cf}{B + \frac{Av}{d-e} \frac{\omega}{W} \cdot Cr} \tag{5}$$

Substituting Pf=Pr=Ps into the equation (4) to determine the split point Ps which is the point of intersection with the straight line Pf=Pr, $$Ps = \frac{F + \frac{Av}{d-e} \left(\frac{\omega}{W} Fo + Pv_{max} \cdot e + f\right)}{B - A + \frac{Av}{d-e} \frac{\omega}{W} \cdot (Cf + Cr)} \tag{6}$$

Up to the split point determined by the equation (6), the output pressure will be kept equal to the input pressure. After the split point, the input pressure will be reduced at the reduction ratio expressed by the equation (5). Because $\omega \cdot Fo \cdot Av/W$ in equation (6) is normally very small, the equations (5) and (6) mean that the increase in the vehicle weight W causes the increase in not only the split point but also in the reduction ratio.

Further, the deceleration $\alpha s$ at the occurrence of the split point can be expressed as follows by making Ps=Pf=Pr in the equation (3) and substituting the value in the equation (6), $$\alpha s = \tag{7}$$

$$\frac{(Cf + Cr)\left\{F + \frac{Av}{d-e}\left(\frac{\omega}{W} \cdot Fo + Pv_{max} \cdot e + f\right)\right\}}{(B - A)W + \frac{Av}{d-e} \omega (Cf + Cr)} -$$

-continued $$\frac{Fo}{W}$$

Because Fo/W is normally very small, if A=B, the deceleration at the split point will be constant regardless of the vehicle weight. The larger the value A is than B, the more the deceleration at the split point increases when the vehicle weight has increased. Therefore, generally the value A should be larger than B (for A=a, B=a−b) for better approximation to the ideal brake force distribution.

In the control valve assembly shown in FIG. 2, the vacuum pressure regulator used in the first embodiment of FIG. 1' is eliminated to make the inertia body compact.

The second embodiment shown in FIG. 2 comprises a valve body 1 having a central bore, a known pressure proportioning valve 5' mounted in the bore and having a plunger 3' adapted to butt a lip seal 25, and a spring 4' urging the plunger in a valve-opening direction for setting the split point. The front end 26 of the plunger 3' butts against the power piston 10 which partitions an air chamber 8 from a regulating chamber 9. An inertia body chamber 29 provided at a lower part of the body 1' communicates through a passage 27 with the regulating chamber 9 and through a passage 28 with an air chamber 8 having an air inlet 7. A ball type inertia body 30 is provided in the inertia body chamber 29. An inertia valve 33 comprises a fixed valve seat 31 provided at one end of the passage 28 and the inertia body 30 which at the occurrence of a deceleration, rolls on a front-up oblique surface 32 at an angle with respect to the horizontal plane to butt against the valve seat 31 to shut the passage 28.

At an upper part of the body 1', a brake fluid pressure detector 36 is provided to control the communication through a passage 35 which connects the regulating chamber 9 through a throttle 34 to a vacuum chamber 18 communicating with a source of vacuum. The detector 36 comprises a piston 37 having one end disposed at an inlet port 23, a shutoff valve 40 having a valve body 38 and a fixed valve seat 39 both moving with the piston 37, and a spring 41 urging the valve body 38 in a valve-closing direction. Only when the brake fluid pressure has increased, the piston 37 detects the pressure increase and moves leftwardly in FIG. 2 to open the shutoff valve 40, so that the passage 35 will communicate with the vacuum chamber 18. The size of the throttle 34 is determined by the air exhaust speed and the seal diameter of the fixed valve seat 31.

In operation, while not braking, the shutoff valve 40 closes the passage 35. Thus, only the vacuum chamber 18 is under vacuum pressure whereas other chambers are under the atmospheric pressure. So, the power piston 10 does not produce any thrust.

When the braking is started, the shutoff valve 40 will open so that the regulating chamber 9 will communicate with the vacuum chamber 18. At the same time, in response to the deceleration that has ocuurred, the inertia valve 33 will operate to close the passage to the air chamber 8. Thereafter, the pressure difference between the air chamber 8 and the regulating chamber 9 is determined by balance between the inertia force acting on the inertia body and the pressure difference between the air chamber and the regulating chamber, speed of air evacuation by vacuum source, discharge speed through the throttle 34, etc. The pressure difference produces a thrust proportional to the deceleration. The thrust is applied through the power piston 10 to the plunger 3'.

In this state, the forces acting on the plunger 3 from both sides are the same as expressed in equation (1).

Also, balance of the forces acting on the inertia body 33 can be expressed as follows:

$$Pv \cdot Ac = \omega \alpha \cos \theta - \omega \sin \theta \tag{8}$$

wherein

Ac: Effective pressure-receiving surface on the inertia body
ω: Weight of the inertia body
θ: Gradient of the inclined surface 32
α: Deceleration By eliminating Pv and α from the equations (1), (2) and (3), the output pressure Pr can be expressed as follows:

$$Pr = \frac{\left(A - \frac{Av}{Ac} \frac{\omega}{W} \cos\theta \cdot Cf\right) Pf + F + \frac{Av}{Ac} \frac{\omega}{W} Fo \cdot \cos\theta + \frac{Av}{Ac} \omega \sin\theta}{B + \frac{Av}{Ac} \frac{\omega}{W} \cos\theta \cdot Cr} \tag{9}$$

The reducing ratio R can be expressed as follows:

$$R = \frac{A - \frac{Av}{Ac} \frac{\omega}{W} \cos\theta \cdot Cf}{B + \frac{Av}{Ac} \frac{\omega}{W} \cos\theta \cdot Cr} \tag{10}$$

The split point Ps can be expressed as follows:

$$Ps = \frac{F + \frac{Av}{Ac} \omega \left(\sin\theta + \frac{Fo}{W} \cos\theta\right)}{B - A + \frac{Av}{Ac} \frac{\omega}{W} \cos\theta \cdot (Cf + Cr)} \tag{11}$$

Further, the deceleration $\alpha_s$ at the occurrence of the split point can be expressed as follows:

$$\alpha_s = \frac{(Cf + Cr)\left\{F + \frac{Av}{Ac} \omega \left(\sin\theta + \frac{Fo}{W} \cos\theta\right)\right\}}{(B - A) W + \frac{Av}{Ac} \omega \cos\theta (Cf + Cr)} - \tag{12}$$

$$\frac{Fo}{W}$$

Because Fo/W is normally very small, as in the first embodiment, the split point and the reduction ratio increase as the vehicle weight W increases. Therefore, generally A should be larger than B (for A=a, B=a−b) for better approximation to the ideal brake force distribution.

The second embodiment has an advantage that a small inertia body will do when the size of Ac is set to be small.

In either of the embodiments, a throttle 42 should be provided for the reason mentioned below.

In these embodiments, the vacuum pressure used as the control fluid pressure firstly balances with the deceleration, thereafter the thrust on the power piston balances with the input and output pressures. If response is poor, in spike or abrupt braking, the output pressure could increase excessively, causing locking of the rear wheels, after which it decreases to a normal pressure by the function of the pressure proportioning valve 5 (in the second embodiment the head 43 of the plunger 3' gets into the lip seal 25 to increase the volume of the output circuit and thus decrease the output pressure). The throttle 42 is provided to prevent such a locking by retarding the supply of fluid into the pressure proportioning valve 5 and avoiding a sharp increase of the output pressure.

What we claim:

1. A deceleration-balanced type brake pressure control valve assembly for a vehicle comprising: a vacuum pressure regulating means for generating a controlled vacuum pressure proportional to the deceleration of the vehicle; a fluid motor responsive to differences in atmospheric pressure and the controlled vacuum pressure obtained by said vacuum pressure regulating means;

an inertia body adapted to be acted upon by the deceleration of the vehicle; a valve means having a plunger for opening and closing a passage connecting an inlet of brake fluid with an outlet thereof; sand fluid motor being operatively connected to said plunger;

a spring for urging said plunger in a valve opening direction; said plunger being responsive to the brake fluid pressure and adapted to open and close said valve means when moved axially by the brake fluid, and urged by the fluid pressure at the fluid inlet and said spring in a valve opening direction and urged by the fluid pressure at the fluid outlet and said fluid motor in a valve closing direction;

said valve means being normally kept open by said spring, characterized in that said controlled vacuum pressure is substantially equal to atmospheric pressure until the deceleration of the vehicle reaches a predetermined level, and that said inertia body is disposed in a chamber acted upon by said controlled vacuum pressure.

2. A deceleration-balanced type brake control valve assembly as claimed in claim 1, wherein said vacuum pressure regulating means comprises a diaphragm having one side exposed to an atmospheric pressure and the other side disposed in a regulating chamber acted upon by said controlled vacuum pressure and formed with a hole communicating the atmospheric pressure with said regulating chamber, an inlet of vacuum pressure connected to a source of vacuum pressure, an annular valve body integral with said inertia body and adapted to engage said hole formed in said diaphragm to close it, a spring for urging said diaphragm against said inlet of vacuum pressure, said hole being open with said valve body away from said diaphragm so that said regulating chamber will be connected to an atmospheric pressure, until the deceleration of the vehicle reaches a predetermined level.

3. A brake pressure control valve assembly as claimed in claim 1, wherein said vacuum pressure regulating means comprises an air chamber, a fixed valve seat is disposed between said regulating chamber and said air chamber, an inertia body rolling on a surface oblique with respect to the horizontal plane to abut against said fixed valve seat and thereby to close the communication between said air chamber and said regulating chamber, a vacuum chamber connected to a source of vacuum, a shutoff valve means disposed between said vacuum chamber and said regulating chamber for causing them to communicate with each other only when the brake fluid pressure has increased to a predetermined level, and a throttle disposed between said vacuum chamber and said shutoff valve means for regulating the rate of discharge of air from said regulating chamber, said inertia body permitting communication between said air chamber and said regulating chamber until the deceleration of the vehicle reaches a predetermined level.

* * * * *